United States Patent
Oyama et al.

(10) Patent No.: US 7,154,738 B2
(45) Date of Patent: Dec. 26, 2006

(54) POLARIZING ELECTRODE FOR ELECTRIC DOUBLE LAYER CAPACITOR AND ELECTRIC DOUBLE LAYER CAPACITOR THEREWITH

(75) Inventors: Shigeki Oyama, Shioya-gun (JP); Manabu Iwaida, Saitama (JP); Kenichi Murakami, Utsunomiya (JP)

(73) Assignees: Honda Motor Co., Ltd., Tokyo (JP); Kuraray Chemical Co., Ltd., Okayama (JP)

( * ) Notice: Subject to any disclaimer, the term of this patent is extended or adjusted under 35 U.S.C. 154(b) by 562 days.

(21) Appl. No.: 10/721,468

(22) Filed: Nov. 26, 2003

(65) Prior Publication Data
US 2004/0114307 A1 Jun. 17, 2004

(30) Foreign Application Priority Data

| | | | |
|---|---|---|---|
| Nov. 29, 2002 | (JP) | | 2002-349171 |
| Nov. 29, 2002 | (JP) | | 2002-349173 |
| Oct. 29, 2003 | (JP) | | 2003-369380 |
| Oct. 29, 2003 | (JP) | | 2003-369382 |

(51) Int. Cl.
*H01G 9/00* (2006.01)
(52) U.S. Cl. ............... 361/502; 361/503; 361/504; 361/508; 361/512; 361/516; 423/445 R
(58) Field of Classification Search ........... 361/502, 361/503–504, 508–512, 516, 518, 523, 525–528; 29/25.03; 240/294; 423/445 R
See application file for complete search history.

(56) References Cited

U.S. PATENT DOCUMENTS 6,110,335 A * 8/2000 Avarbz et al. .............. 204/294
6,327,136 B1 * 12/2001 Meguro et al. ............. 361/502
6,359,769 B1 * 3/2002 Mushiake et al. .......... 361/502
6,660,583 B1 * 12/2003 Fujino et al. ............... 438/253
6,697,249 B1 * 2/2004 Maletin et al. ............. 361/502

FOREIGN PATENT DOCUMENTS

| JP | 62-154461 A | 7/1987 |
|---|---|---|
| JP | 01-241811 A | 9/1989 |
| JP | 4-177713 A | 6/1992 |
| JP | 9-320906 A | 12/1997 |
| JP | 11-45832 A | 2/1999 |
| JP | 11-87190 A | 3/1999 |
| JP | 2000-277391 A | 10/2000 |
| JP | 2001-52972 A | 2/2001 |
| JP | 2002-151364 A | 5/2002 |
| JP | 2002-231590 A | 8/2002 |

* cited by examiner

*Primary Examiner*—Nguyen T. Ha
(74) *Attorney, Agent, or Firm*—Arent Fox PLLC

(57) ABSTRACT

A polarizing electrode for an electric double layer capacitor has good moldability and is capable of achieving higher density of electrode and higher capacity. An electric double layer capacitor employs the same. The polarizing electrode for an electric double layer capacitor is made of an activated carbon obtained by activating a hard-to-graphitize material (for example, phenol resin) with water vapor, and the activated carbon has a median particle size within a range from 4 μm to 8 μm in the particle size distribution as measured by a laser diffraction method and a benzene adsorption ratio of not less than 47.0% and not more than 60% by weight of activated carbon.

4 Claims, 5 Drawing Sheets

POLARIZING ELECTRODE FOR ELECTRIC DOUBLE LAYER CAPACITOR AND ELECTRIC DOUBLE LAYER CAPACITOR THEREWITH

BACKGROUND OF THE INVENTION

Priority is claimed on Japanese Patent Application No. 2002-376504, filed Dec. 26, 2003, the content of which is incorporated herein by reference.

1. Field of the Invention

The present invention relates to a polarizing electrode for an electric double layer capacitor and relates to an electric double layer capacitor using the polarizing electrode.

2. Description of Related Art

An electric double layer capacitor utilizes electrical energy stored in an electric double layer which is formed at the interface between a polarizing electrode and an electrolytic solution.

The electric double layer capacitor has a large Farad level capacity and excellent charge and discharge cycle characteristics, and it is therefore used in such applications as a backup power source for electrical equipment and a vehicle-mounted battery.

Referring to FIG. 6, for example, an electric double layer capacitor 1 has two polarizing electrodes incorporated therein, namely a first electrode 2 and a second electrode 3. The first electrode 2 and the second electrode 3 are separated from each other by a separator 4.

The first electrode 2 and a first current collector (hereinafter also referred to as a cap) 5 that is disposed outside the former constitutes one electrode unit 7 and functions as an anode. The second electrode 3 and a second current collector (hereinafter also referred to as a casing) 6 that is disposed outside the former constitute another electrode unit 8 that functions as cathode. Activated carbon that has microscopic pores is preferably used for the first electrode 2 and the second electrode 3 that constitute the electric double layer capacitor 1 (see Patent Document 1).

As shown in FIG. 7, the two polarizing electrodes 11 and 12 made of activated carbon that constitute the electric double layer capacitor are impregnated with an electrolytic solution 15 consisting of a solvent and an electrolyte. Electrolyte ions 16 and 17 are adsorbed so as to congregate in the pores 18 and 19 of the activated carbon that makes the two polarizing electrodes 11 and 12 through salvation with the electrolytic solution 15, so that the polarizing electrode 11 and the electrode unit 13 form an anode while the other polarizing electrode 12 and the electrode unit 14 form a cathode.

The activated carbon that makes the two electrodes can be regarded as providing a place for the solvent and the electrolyte ions to act electrochemically with each other thereon. Thus, the physical properties and microscopic structure of the activated carbon are among the factors that have great influence on the performance of the electric double layer capacitor.

As another example of the electric double layer capacitor described above, such a capacitor is known as an electrode unit formed in a sheet with a metallic body having electrical conductivity made into a foil (hereinafter referred to as an electrically conductive metal foil) pasted using an electrically conductive adhesive to form an integral member which is wound. For the electrically conductive metal foil, for example, a foil made of a metal such as aluminum (Al) is preferably used as it is after being etched on the surface thereof.

One of characteristics required of an electrode for a capacitor of high output power (about 250 W per cell) intended for use in automobile is a low internal resistance and sufficient capacity that enables it to draw a large current.

The capacity of a capacitor can be increased by increasing the capacity per unit weight of electrode (F/g). In the case in which there is a limitation to the volume of the capacitor module for the installation on automobiles or the like, capacity per unit volume of electrode (F/cc) must be increased instead of capacity per unit weight of electrode (F/g). Increasing the capacity per unit volume of electrode (F/cc) means increasing the molding density of electrode.

For increasing the molding density of an electrode, such methods are known as increasing the density of activated carbon without decreasing the capacity per unit weight, or molding the electrode in a close-packed structure.

As the former method, that is, to increase the density of activated carbon, Patent Document 1 discloses a method in which an easy-to-graphitize material is used to make the activated carbon, so that a carbon material obtained by carbonizing the former at a temperature of 1000° C. or less in an inert atmosphere is activated with a hydroxide of an alkali metal, thereby producing activated carbon.

However, since it is difficult to control the activation process in a manufacturing process that produces activation using a chemical, and requires a process of washing off the chemical to such a level that it does not affect the operation of the capacitor after the activation, many problems remain to be solved from the viewpoint of manufacturing cost, before the process can be employed for mass production.

For stable production of activated carbon, it is known to activate carbon with a gas such as water vapor, instead of the chemical. In this case, carbon made by carbonizing a hard-to-graphitize material at a temperature around 1000° C. in an inert atmosphere is used. In the case of this method, there has been a problem in that since a hard-to-graphitize material which is relatively easy to activate is used, formation of microscopic pores in the activated carbon proceeds excessively and, as a result, density of the activated carbon tends to decrease.

As methods of the latter category, that is, to form the electrode having a close-packed structure, there are such methods as the density of an electrode sheet is increased by controlling the load of rolling when forming the electrode sheet (see Patent Document 2), and a method of controlling the particle size of the activated carbon that is the main component (see Patent Document 3).

However, an electrode formed to have a high density by any of the methods described above has problems such as cracking, rupturing or other significant molding defects occurring in the molded sheet or problems such as a decrease in the infiltration rate of the electrolytic solution or insufficient impregnation occur in the process of impregnating with the electrolytic solution during assembly of the capacitor.

There has also been a problem in that it is difficult to determine whether the activated carbon is good as a stock feed in advance, since the moldability and the electrode density can be evaluated only after the material is formed into a sheet.

[Patent Document 1] Japanese Patent Application, First Publication No. Hei 9-320906

[Patent Document 2] Japanese Patent Application, First Publication No. 2000-277391

[Patent Document 3] Japanese Patent Application, First Publication No. 2001-52972

BRIEF SUMMARY OF THE INVENTION

In view of the circumstances described above, an object of the present invention is to provide a polarizing electrode for an electric double layer capacitor which has better moldability and allows it to increase both the density and capacity of the electrode, and an electric double layer capacitor therewith.

To achieve the above object, the present invention has been studied through two approaches as represented by a first aspect and a second aspect. The results are shown below.

The first aspect of the present invention provides a polarizing electrode for an electric double layer capacitor, comprising an activated carbon obtained by activating a hard-to-graphitize material with water vapor, wherein the activated carbon has a median particle size within a range from 4 µm to 8 µm in the particle size distribution as measured by a laser diffraction method and a benzene adsorption ratio is within a range from 47.0% to 60% by weight of benzene.

The activated carbon having different median particle sizes in particle size distributions were measured by a laser diffraction method (using, for example, SALD-3000S analyzer of Shimadzu Corporation, described in detail in the Examples) and different benzene adsorption ratios determined by measuring the weight difference of benzene vapor adsorbed onto the activated carbon can be obtained on a stable basis, by activating the hard-to-graphitize material (for example, phenol resin described in the Examples) with water vapor.

In the case in which the activated carbon has a median particle size less than 4 µm in the particle size distribution, the strength of the electrode sheet decreases monotonically as the median particle size decreases. In the case in which the median particle size is larger than 8 µm, on the other hand, the strength of the electrode sheet decreases sharply as the median particle size increases. Activated carbon having a median particle size within a range from 4 µm to 8 µm in the particle size distribution is preferable since it enables it to ensure very high strength of the electrode sheet of around 5 kgf/cm$^2$.

The activated carbon having a benzene adsorption ratio within a range from 47.0% to 60% by weight of benzene is preferable because the resulting electrode sheet has high strength of around 5 kgf/cm$^2$. It was confirmed that, in the case in which the benzene adsorption ratio of the activated carbon is below 47.0% or over 60%, the strength of the electrode sheet shows decreasing trend. The activated carbon having a median particle size in a particle size distribution and benzene adsorption ratio within the above range enables it to achieve a relatively high density of the electrode sheet above 0.630 g/cc.

Based on the results described above, a polarizing electrode for an electric double layer capacitor using the activated carbon that has a median particle size within a range from 4 µm to 8 µm in the particle size distribution and a benzene adsorption ratio within a range from 47.0% to 60% by weight of activated carbon has relatively high strength as an electrode sheet, and therefore can be better molded in the production of a polarizing electrode used for lamination with an Al foil, and thus, manufacturing cost can be decreased and the density and capacity of the polarizing electrode can be increased.

The present invention also provides an electric double layer capacitor having an electrode unit comprising a current collector and a polarizing electrode, a separator and an electrolytic solution, wherein the polarizing electrode is made of activated carbon obtained by activating a hard-to-graphitize material with water vapor, and the activated carbon has a median particle size within a range from 4 µm to 8 µm in the particle size distribution as measured by a laser diffraction method and a benzene adsorption ratio is within a range from 47.0% to 60% by weight of activated carbon.

With such a constitution, since the activated carbon that makes the polarizing electrode of the electric double layer capacitor has a median particle size in a range described above (from 4 µm to 8 µm) and a benzene adsorption ratio (from 47.0% to 60% by weight of activated carbon) and shows the ratio of capacity maintained after 2000 hours of around 90%, it is made possible to provide an electric double layer capacitor that exhibits high reliability over a long period of time.

The polarizing electrode for electric double layer capacitor according to the first aspect of the present invention is made by using activated carbon that has a median particle size within a range from 4 µm to 8 µm in the particle size distribution and a benzene adsorption ratio within a range from 47.0% to 60% by weight of activated carbon, and therefore, it is made possible to have both relatively high strength and high density of the electrode sheet that leads to good moldability of the polarizing electrode.

The good moldability of the polarizing electrode described above improves stability of operation for handling the polarizing electrode and therefore decreases the manufacturing cost, and high density of the electrode sheet contributes to the manufacture of highly dense polarizing electrodes.

The electric double layer capacitor according to the present invention can achieve a high ratio of capacity maintained after 2000 hours of around 90%, since the polarizing electrode of the constitution described above is used.

As a result, the first aspect of the present invention can provide a polarizing electrode for electric double layer capacitor and the electric double layer capacitor that allows it to decrease the cost and have high performance and long-term reliability.

With the background described above, an object of the second aspect of the present invention is to provide a polarizing electrode, for an electric double layer capacitor, which has better moldability and allows it to increase both the density and capacity of the electrode, and an electric double layer capacitor therewith, similar to the first aspect.

The second aspect of the present invention provides a polarizing electrode, for an electric double layer capacitor, having an activated carbon obtained by activating a hard-to-graphitize material with water vapor, wherein the activated carbon has a content of calcined ash of not more than 0.2% by weight.

Therefore, the present inventors have studied about the activated carbon that constitutes the polarizing electrode for an electric double layer capacitor and found that the activated carbon contains a trace amount of a metal component (impurities) and the metal component such as copper contained in the activated carbon dissolves out from an anode due to potential difference during operation of the capacitor and is deposited on the surface of a cathode in the case of the capacitor produced by using an electrode made of the activated carbon containing a trace amount of the metal component.

It was confirmed that the deposited metal component not only causes short circuiting between electrodes, but also reacts with moisture or organic impurities remaining in the electrodes or electrolytic solution, or the electrolytic solution itself, thereby deteriorating durability (ratio of voltage maintained) of the capacitor.

Although the deposited metal component includes copper, nickel, zinc, tin, iron or the like, the content of each metal component is less than several tens of ppm.

A trace amount of the metal component contained in the activated carbon is previously contained in raw materials of the activated carbon, or the activated carbon is contaminated with the metal component in the manufacturing process thereof.

For example, the activated carbon is often contaminated with the metal component in the process of crushing the activated carbon (using a ball mill, a jet mill, etc.). In the case of crushing using a ball mill, the activated carbon is sometimes contaminated with metal constituting a crushing medium as a result of wear.

In the case of crushing using a jet mill, the activated carbon is sometimes contaminated with metal contained in dust contained in compressed air to be supplied from a compressor, or metal constituting a lining of the crushing medium as a result of wear.

An activated carbon having a content of calcined ash of not more than 0.2% by weight can be obtained by activating a hard-to-graphitize material (for example, phenol resin described in the embodiment) with water vapor.

Preferable content of calcined ash in the activated carbon is not more than 0.2% by weight because the resistivity of the electrode (cell resistivity) can be decreased to 3.40 $\Omega \cdot cm^2$ or less and the conductivity of the electrode increases. When applying this activated carbon to the capacitor, it is made possible to achieve a high ratio of voltage maintained for 72 hours after 100% charging of 80% or more, i.e., a high ratio of self discharge ratio for 72 hours after 100% charging 20% or lower, and thus making it possible to provide an electric double layer capacitor that demonstrates high reliability over a long period of time. When the content of calcined ash exceeds 0.2% by weight, the resistivity of the electrode (cell resistivity) exceeds 3.40 $\Omega \cdot cm^2$ and the conductivity of the electrode decreases. It is not preferable to apply this activated carbon to the capacitor because a ratio of voltage maintained for 72 hours after 100% charging decreased to less than 80%.

The polarizing electrode for electric double layer capacitor obtained by using the activated carbon having the content of calcined ash of not more than 0.2% by weight has both relatively low resistivity and high conductivity, it is made possible to increase the ratio of voltage maintained. As a result, it is made possible to provide an electric double layer capacitor that demonstrates high reliability over a long period of time.

Also, the present invention provides an electric double layer capacitor having an electrode unit comprising a current collector and polarizing electrode, a separator and an electrolytic solution, wherein the polarizing electrode is made of an activated carbon obtained by activating a hard-to-graphitize material with water vapor and the activated carbon has a content of calcined ash of not more than 0.2% by weight.

With such a constitution, since the activated carbon that forms the polarizing electrode of the electric double layer capacitor has a content of calcined ash of not more than 0.2% by weight and can achieve a high ratio of voltage maintained for 72 hours after 100% charging of 80% or more, it is made possible to provide an electric double layer capacitor that demonstrates high reliability over a long period of time.

Since the electric double layer capacitor according to the second aspect of the present invention is made of activated carbon having a content of calcined ash of not more than 0.2% by weight, it is made possible to have both relatively low cell resistivity and high ratio of maintained voltage.

The electric double layer capacitor according to the present invention can achieve a high ratio of voltage maintained after 72 hours of 80% or higher, by using the polarizing electrode of the constitution described above.

As a result, the second aspect of the present invention can provide a polarizing electrode for electric double layer capacitor and the electric double layer capacitor that allow it to decrease the cost and have high performance and long-term reliability.

DETAILED DESCRIPTION OF THE INVENTION

First Aspect of the Present Invention

Figure 1A:
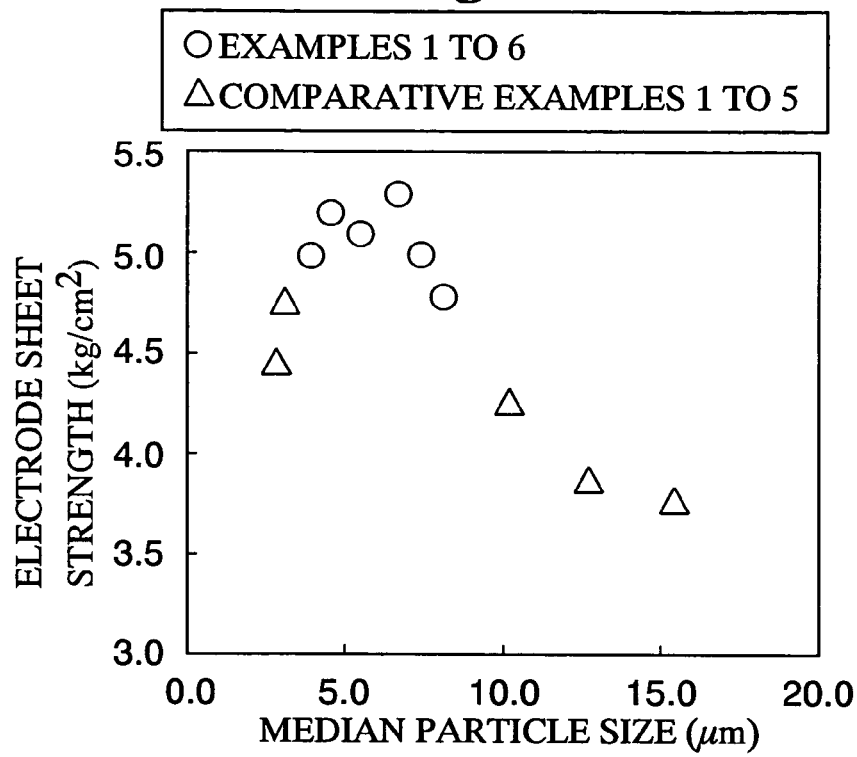
FIGS. 1A and 1B are graphs showing the relationship between the median particle size (1A) or benzene adsorption ratio (1B) and the strength of the electrode sheet.

The activated carbon that constitutes the polarizing electrode for electric double layer capacitor of the first aspect of the present invention is made by activating a hard-to-graphitize material with water vapor.

The term "hard-to-graphitize material" is used for comprehensive reference to materials made of organic compounds which are difficult to graphitize. Difficult to graphitize means that it is difficult to form graphite structure by firing at a temperature of 3000° C. or higher. Formation of graphite structure can be verified by observing a distinct peak of 2θ around 25° in the X-ray diffraction pattern.

The activated carbon that constitutes the polarizing electrode for an electric double layer capacitor of the present invention is preferably made in a manufacturing process based on the method described below.

First, the stock feed used to manufacture the activated carbon of the present invention will be described. A hard-to-graphitize material which is difficult to graphitize is preferably used as the stock feed to manufacture the activated carbon of the present invention. A graphitizing catalyst may be added during graphitization. As organic compounds which are difficult to graphitize, aromatic compounds such as furfuryl alcohol, polycarbonate, cellulose and phenol resin, and aliphatic compounds such as epoxy resin, PVDF (polyvinylidene fluoride), polyvinyl alcohol, nylon and polypropylene may be used.

The activated carbon that constitutes the polarizing electrode for an electric double layer capacitor of the first aspects of the present invention can be manufactured in a procedure described below by using the materials described above. A process of using phenol resin as the hard-to-graphitize material which is fired at a temperature at which a graphite structure is formed and is then activated with water vapor will herein be described.

The heat treatment at a temperature at which a graphite structure is formed is carried out at a temperature usually within a range from 400 to 1000° C., preferably from 5.00 to 800° C., and more preferably from 500 to 700° C., in a non-oxidizing atmosphere, for example, in the presence of nitrogen ($N_2$) gas flow. Duration of the treatment is normally up to 24 hours, preferably from 1 to 10 hours, and more preferably from 2 to 5 hours. Other conditions for the treatment may be determined in accordance with such factors as the material to be used and the kind of electrode to be made.

Activation by water vapor can be carried out by an ordinary method. In a preferred embodiment, activation by water vapor is carried out as follows. A scrubbing bottle containing pure water is kept at a temperature within a range from room temperature to 100° C., preferably at 80° C., and nitrogen gas is passed through the water and activation is carried out by means of the nitrogen gas containing water vapor. Specifically, the temperature is raised to a level from 800 to 1000° C., preferably 900° C. in the presence of a nitrogen gas flow and, after a predetermined temperature (for example, 800° C.) has been reached, activation is carried out by using a mixed gas of nitrogen and water vapor for a period from 5 minutes to 10 hours.

The activated carbon prepared as described above is crushed using a crushing means such as a jet mill, ball mill or the like, thus making it possible to obtain an activated carbon having a predetermined particle size distribution for the polarizing electrode for an electric double layer capacitor of the present invention.

The activated carbon thus obtained can then be used to make a polarizing electrode for an electric double layer capacitor by an ordinary method. In order to make a sheet-like polarizing electrode, for example, the following method may be used.

The activated carbon made from phenol resin, graphite powder used as an electrically conductive filler, and Teflon® used as a binder are mixed in predetermined proportions (for example, 90:5:5 by weight proportion) and the mixture is rolled into a sheet 150 µm thick. The sheet is punched through in a circular shape to form a polarizing electrode having a diameter of 20 mm.

Figure 6:
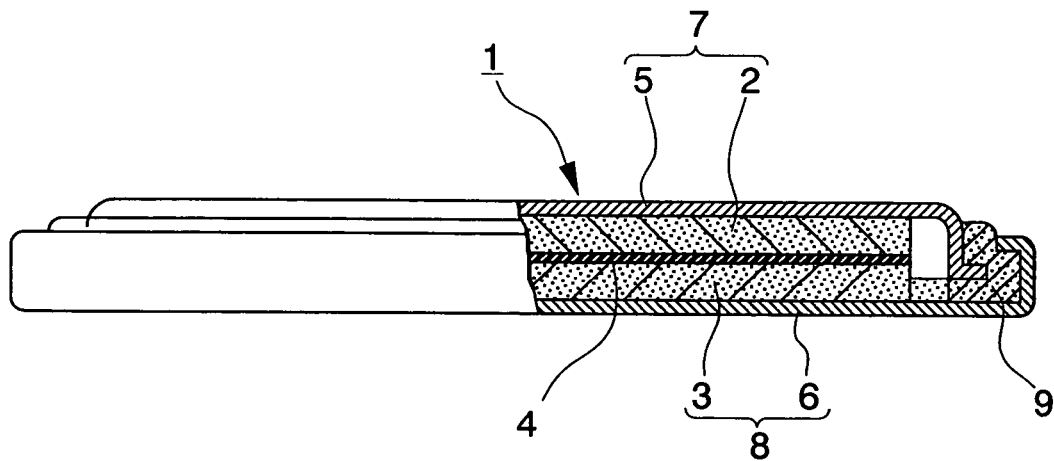
FIG. 6 shows an example of an electric double layer capacitor.
Figure 7:
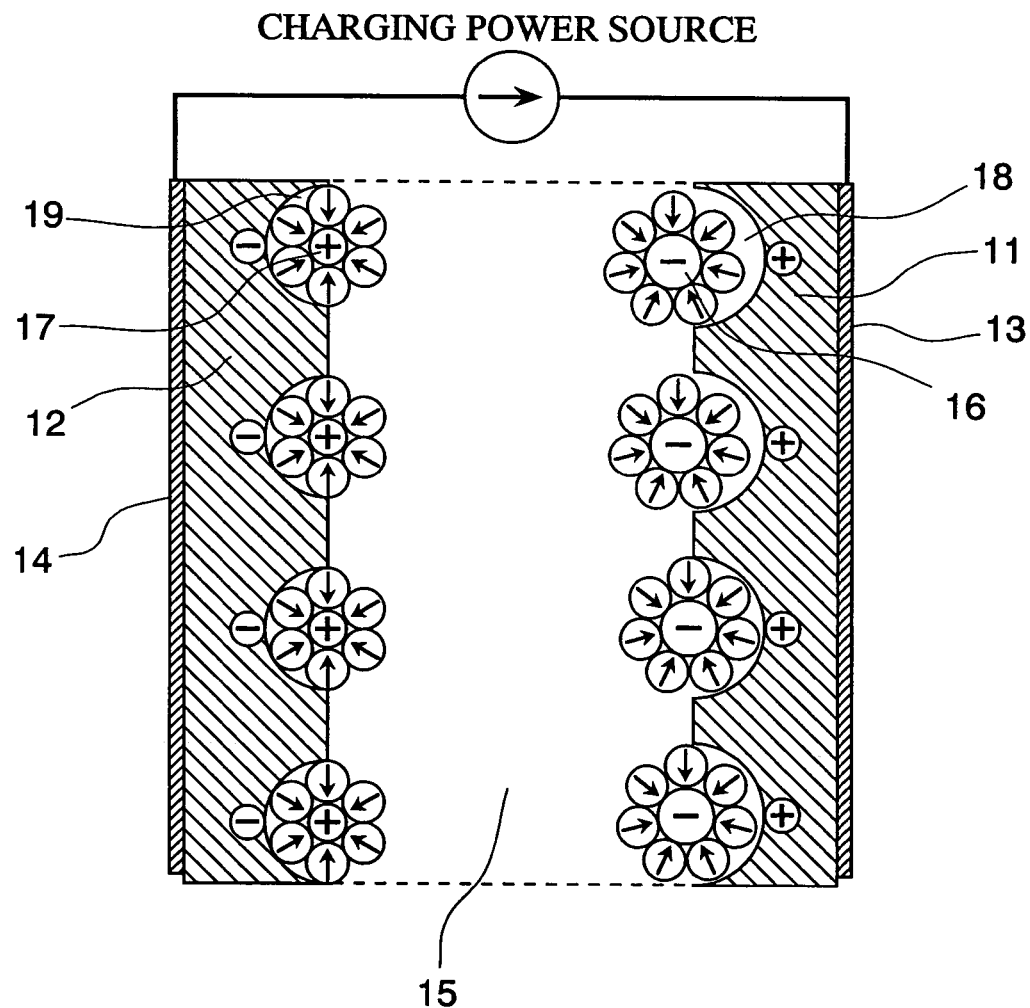
FIG. 7 is a schematic diagram showing ions contained in the electrolytic solution being adsorbed by the electrode.

Then as shown in FIG. 6, an electrode unit made by sandwiching a separator by two sheet-like polarizing electrodes 2 and 3 is disposed in a casing 6 made of an electrically conductive material that serves as the cathode. After pouring an electrolytic solution into the casing, a cap 5 made of an electrically conductive material that serves as the anode is placed on it and edges of the casing 6 and the cap 5 are calked together via a packing 9 made of an insulating material for sealing, thereby forming the electric double layer capacitor 1.

The median particle size, which is an index that represents the activated carbon, can be determined from the particle size distribution observed by a laser diffraction method (using, for example, SALD-3000S analyzer of Shimadzu Corp). The benzene adsorption ratio can be determined by using the measuring method specified in Japanese Industrial Standard JIS K1474-1991.

The strength of the electrode sheet, which is an index that indicates the performance of the capacitor, can be determined by measuring the tensile strength by using, for example, EZ Test-100N of Shimadzu Corporation. The density of the electrode sheet can be determined, for example, by measuring the apparent density using a micrometer.

The ratio of capacity maintained after endurance is the electrostatic capacity demonstrated after 2000 hours of 2.5 V continuous voltage application test at 45° C. divided by the electrostatic capacity demonstrated before applying the voltage, given in percentage. The electrostatic capacity can be determined from the energy discharged by repeatedly charging and discharging with predetermined values of voltage and current (for example, charge voltage of 2.5 V and charge current of 5 mA) using a predetermined electrolytic solution (for example, propylene carbonate solution of triethylmethyl ammonium tetrafluoroborate: TEMA•$BF_4$/PC, 1.8 mol/l in concentration).

EXAMPLES

The present invention will be described below by way of examples, but it should be noted that the present invention is not limited by the following examples.

Example 1

The activated carbon powder of this example was made by the following procedure.

(1) A phenol resin granulated to have a particle size of about 3 mm was carbonized by being held in a nitrogen gas flow at 900° C. for two hours.

(2) Carbon thus obtained was heated again in the nitrogen gas flow and, when the temperature reached 800° C., nitrogen gas containing 5% water vapor and 5% carbon dioxide was supplied and the carbon was held at 900° C. (hereinafter referred to as an activation temperature) for two hours (hereinafter referred to as an activation time), so as to be activated.

(3) The activated carbon thus obtained was left to cool down, and was crushed into the activated carbon of this example by using a ball mill employing high-purity alumina balls and operated at a rotational speed of 15 rpm for 180 hours (hereinafter referred to as the crushing time).

The median particle size of the activated carbon made as described above was determined from the particle size distribution observed by a laser diffraction method (using, for example, SALD-3000S analyzer manufactured by Shimadzu Corporation).

The benzene adsorption ratio of the activated carbon made as described above was determined by using the measuring method specified in Japanese Industrial Standard JIS K1474-1991.

The activated carbon was mixed with 5% by weight of Teflon 6J® (manufactured by Du Pont-Mitsui Fluorochemicals Co., LTD.) and 5% of Denka Black® (manufactured by DENKI KAGAKU KOGYO KABUSHIKI KAISHA) added thereto as a binder, and was formed by pressure powder molding into a polarizing electrode measuring 20 mm in diameter and 150 µm in thickness measured with a micrometer. The polarizing electrode was dried at 150° C. in a vacuum for four hours, and was weighed to determine the density of the electrode.

A PC solution of $1.8M(C_2H_5)_3CH_3N.BF_4$ was used as the electrolytic solution, and the electrostatic capacity was determined from the energy discharged by charging for two hours with constant current and constant voltage conducted at a charge voltage of 2.5 V and charge current of 5 mA. The ratio of capacity maintained after endurance was determined by dividing the electrostatic capacity demonstrated after 2000 hours of 2.5 V continuous voltage application test at 45° C. by the electrostatic capacity demonstrated before applying the voltage, given in percentage.

Table 1 shows the median particle size and benzene adsorption ratio of the activated carbon obtained in Example 1, and the density and ratio of capacity maintained after endurance of the polarizing electrode.

Examples 2 to 6

In these examples, activated carbons were made in the same manner as in Example 1, except for setting the crushing time to 130 hours (Example 2), 110 hours (Example 3), 80 hours (Example 4), 50 hours (Example 5) and 30 hours (Example 6). The median particle size and benzene adsorption ratio of the activated carbon, and the density and ratio of capacity maintained after endurance of the polarizing electrode were also determined by similar methods. These figures are also shown in Table 1.

Examples 7

In this example, activated carbon was made in the same manner as in Example 1, except for setting the activation time to 0.5 hours and the crushing time to 80 hours. The median particle size and benzene adsorption ratio of the activated carbon, and the density and ratio of capacity maintained after endurance of the polarizing electrode were also determined by similar methods. These figures are also shown in Table 1.

Examples 8 to 12

In these examples, activated carbons were made in the same manner as in Example 7, except for setting the activation time to 0.75 hours (Example 8), 1.0 hours (Example 9), 1.25 hours (Example 10), 2.5 hours (Example 11) and 3.0 hours (Example 12). The median particle size and benzene adsorption ratio of the activated carbon, and the density and ratio of capacity maintained after endurance of the polarizing electrode were also determined by similar methods. These figures are also shown in Table 1.

Comparative Example 1

In this comparative example, activated carbon was made in the same manner as in Example 1, except for setting the crushing time to 300 hours. The median particle size and benzene adsorption ratio of the activated carbon, and the density and ratio of capacity maintained after endurance of the polarizing electrode were also determined by similar methods. These figures are also shown in Table 2.

Comparative Examples 2 to 5

In this example, activated carbons were made in the same manner as in Comparative Example 1, except for setting the crushing time to 250 hours (Comparative Example 2), 20 hours (Comparative Example 3), 18 hours (Comparative Example 4) and 15 hours (Comparative Example 5). The median particle size and benzene adsorption ratio of the activated carbon, and the density and ratio of capacity maintained after endurance of the polarizing electrode were also determined by similar methods. These figures are also shown in Table 2.

Comparative Example 6

In this example, activated carbon was made in the same manner as in Comparative Example 1, except for setting the activation temperature to 850° C., the activation time to 0.25 hours, and the crushing time to 80 hours. The median particle size and benzene adsorption ratio of the activated carbon, and the density and ratio of the capacity maintained after endurance of the polarizing electrode were also determined by similar methods. These figures are also shown in Table 2.

Comparative Examples 7 to 10

In these examples, activated carbons were made in the same manner as in Comparative Example 6, except for setting the activation temperature to 800° C. and the activation time to 0.25 hours (Comparative Example 7), the activation temperature to 850° C. and the activation time to 0.5 hours (Comparative Example 8), the activation temperature to 900° C. and the activation time to 4 hours (Comparative Example 9) and the activation temperature to 900° C. and the activation time to 4.5 hours (Comparative Example 10). The median particle size and benzene adsorption ratio of the activated carbon, and the density and ratio of capacity maintained after endurance of the polarizing electrode were also determined by similar methods. These figures are also shown in Table 2.

TABLE 1

| Example No. | Median particle size (μm) | Benzene adsorption ratio (wt %) | Electrode density (g/cc) | Electrode strength (kgf/cm$^2$) | Ratio of capacity maintained (%) |
|---|---|---|---|---|---|
| 1 | 3.9 | 56.3 | 0.669 | 5.0 | 89.5 |
| 2 | 4.5 | 56.3 | 0.663 | 5.2 | 90.6 |
| 3 | 5.6 | 56.3 | 0.658 | 5.1 | 91.7 |
| 4 | 6.8 | 56.3 | 0.651 | 5.3 | 91.7 |
| 5 | 7.5 | 56.3 | 0.645 | 5.1 | 91.9 |
| 6 | 8.2 | 56.3 | 0.638 | 5.1 | 91.9 |
| 7 | 6.3 | 47.0 | 0.932 | 5.1 | 90.3 |
| 8 | 6.2 | 49.4 | 0.722 | 5.3 | 90.8 |
| 9 | 5.9 | 52.9 | 0.683 | 5.2 | 91.3 |
| 10 | 6.2 | 56.3 | 0.668 | 5.0 | 91.2 |
| 11 | 6.1 | 59.0 | 0.640 | 4.9 | 90.8 |
| 12 | 5.9 | 60.5 | 0.630 | 4.9 | 90.3 |

TABLE 2

| Comparative Example No. | Median particle size (μm) | Benzene adsorption ratio (wt %) | Electrode density (g/cc) | Electrode strength (kgf/cm$^2$) | Ratio of capacity maintained (%) |
|---|---|---|---|---|---|
| 1 | 2.8 | 56.3 | 0.680 | 4.1 | 78.0 |
| 2 | 3.1 | 56.3 | 0.671 | 4.3 | 84.7 |
| 3 | 10.3 | 56.3 | 0.628 | 4.1 | 90.7 |
| 4 | 12.8 | 56.3 | 0.612 | 3.8 | 90.8 |
| 5 | 15.6 | 56.3 | 0.598 | 3.6 | 90.6 |
| 6 | 6.2 | 45.2 | 0.748 | 4.3 | 69.5 |
| 7 | 6.1 | 43.3 | 0.752 | 4.7 | 74.7 |

TABLE 2-continued

| Comparative Example No. | Median particle size (μm) | Benzene adsorption ratio (wt %) | Electrode density (g/cc) | Electrode strength (kgf/cm$^2$) | Ratio of capacity maintained (%) |
|---|---|---|---|---|---|
| 8 | 6.3 | 46.1 | 0.738 | 4.8 | 83.2 |
| 9 | 5.9 | 61.3 | 0.618 | 4.1 | 88.3 |
| 10 | 6.1 | 62.6 | 0.609 | 3.6 | 87.2 |

Figure 1B:
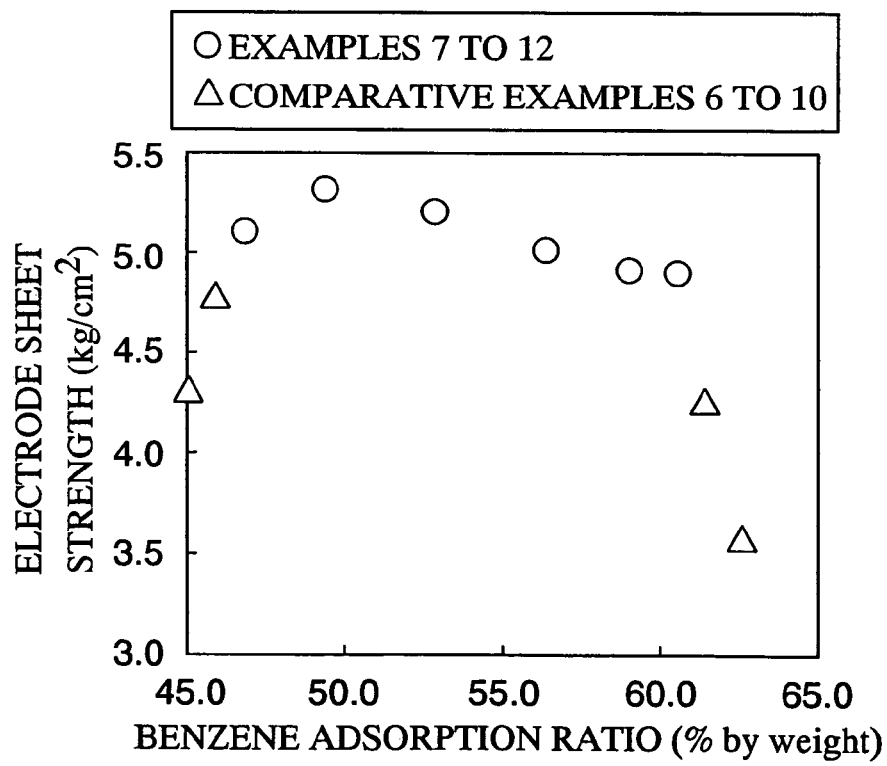

FIGS. 1A and 1B are graphs showing the relationship between the median particle size (1A) or benzene adsorption ratio (1B) and the strength of the electrode sheet. From FIG. 1A, it was found that very high strength of the electrode sheet round 5 kgf/cm$^2$ can be ensured by using the activated carbon that has a median particle size within a range from 4 μm to 8 μm in the particle size distribution. It is not preferable that the strength of the electrode sheet monotonically decrease as the median particle size of the activated carbon decreases when the median particle size is smaller than 4 μm, while the strength of the electrode sheet drastically decreases as the median particle size of the activated carbon increases when the median particle size is larger than 8 μm.

From FIG. 1B, it was found that very high strength of the electrode sheet of around 5 kgf/cm$^2$ can be ensured by using the activated carbon that has a benzene adsorption ratio within a range from 47.0% to 60% by weight of activated carbon. It is not preferable that the benzene adsorption ratio be below 47.0% or over 60% because the strength of the electrode sheet shows a tendency to decrease.

Figure 2A:
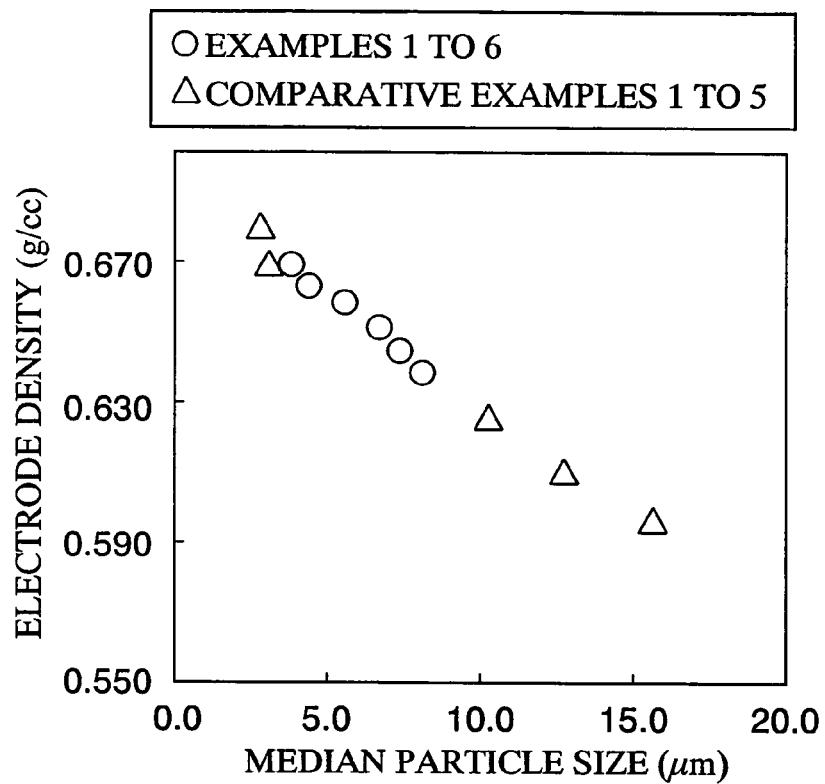
FIGS. 2A and 2 B are graphs showing the relationship between the median particle size (2A) or benzene adsorption ratio (2B) and the density of the electrode sheet.
Figure 2B:
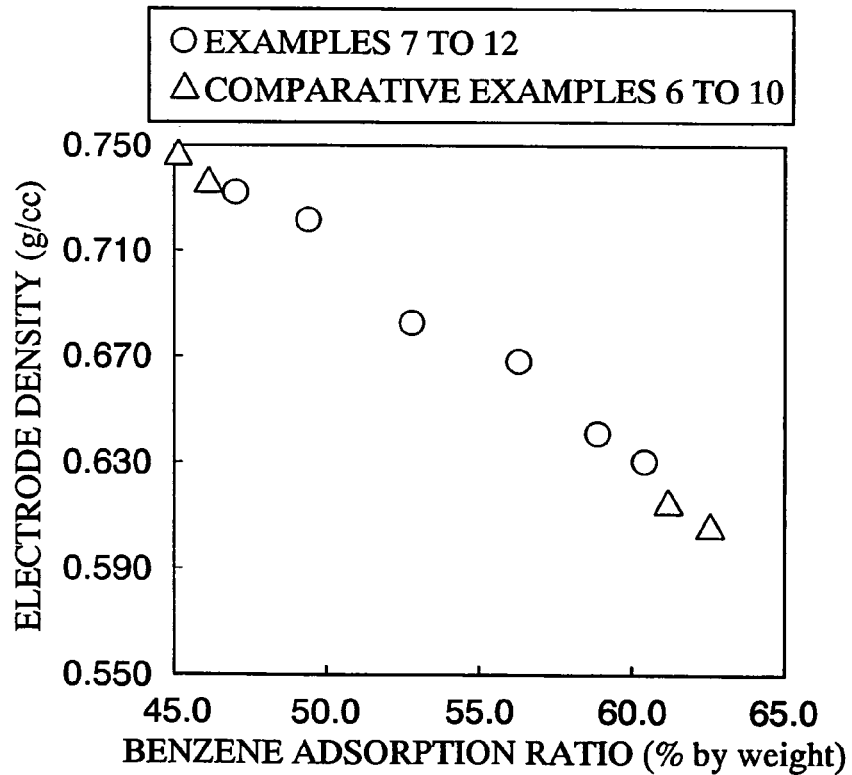

FIGS. 2A and 2B are graphs showing the relationship between the median particle size (2A) or benzene adsorption ratio (2B) and the density of the electrode sheet. From FIG. 2A, it was found that the density of the electrode sheet monotonically decreases as the median particle size of the activated carbon increases. From FIG. 2B, it was also found that the density of the electrode sheet shows the same trend as that of the median particle size with respect to the benzene adsorption ratio.

It can be seen from the graphs of FIGS. 2A and 2B that relatively high density of the electrode sheet, greater than 0.630 g/cc, can also be achieved by the activated carbon that has a median particle size (from 4 μm to 8 μm) which enables it to form an electrode sheet having very high strength of around 5 kgf/cm$^2$ as shown in FIGS. 1A and 1B, and has a benzene adsorption ratio (from 47.0% to 60% by weight of activated carbon).

From the results shown in FIGS. 1A and 1B, and FIGS. 2A and 2B, it was confirmed that both relatively high strength and density of the electrode sheet can be achieved in a polarizing electrode for an electric double layer capacitor made by using activated carbon having a median particle size within a range from 4 μm to 8 μm and a benzene adsorption ratio within a range from 47.0% to 60% by weight of activated carbon.

Figure 3A:
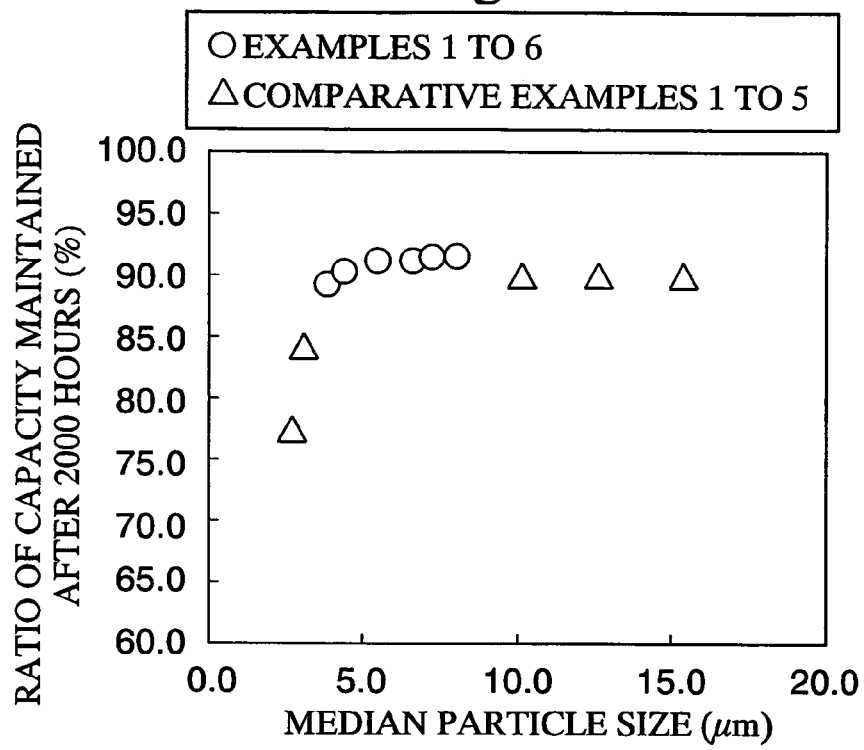
FIGS. 3A and 3 B are graphs showing the relationship between the median particle size (3A) or benzene adsorption ratio (3B) and the ratio of capacity maintained after 2000 hours.
Figure 3B:
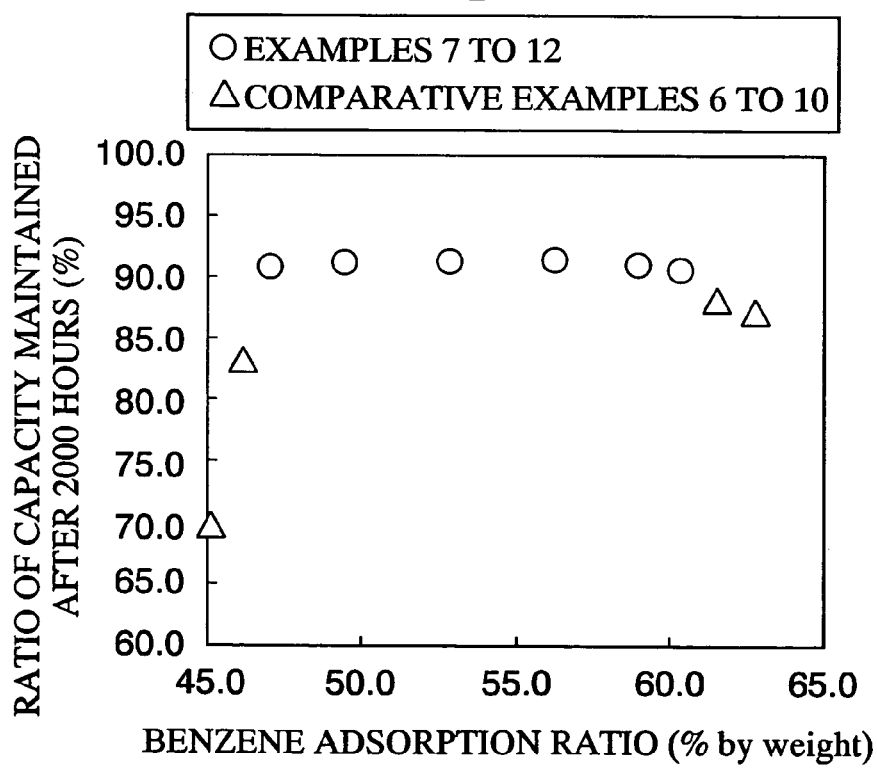

FIGS. 3A and 3B are graphs showing the relationship between the median particle size (3A) or benzene adsorption ratio (3B) and the ratio of capacity maintained after 2000 hours. From FIG. 3A, it became apparent that high ratio of capacity maintained after 2000 hours of around 90% can be achieved when the median particle size in the particle size distribution is larger than 4 μm. It is not preferable that the ratio of capacity maintained rapidly decreases as the median particle size decrease when the median particle size is smaller than 4 μm.

From FIG. 3B, it was found that a high ratio of capacity maintained after 2000 hours of around 90% can be ensured by using the activated carbon that has a benzene adsorption ratio within a range from 47.0% to 60% by weight of activated carbon. It is not preferable that the ratio of capacity maintained show a tendency to decrease when the benzene adsorption ratio is below 47.0% or over 60%.

As is apparent from the results of FIGS. 3A and 3B, a high ratio of capacity is maintained after repeatedly charging and discharging for 2000 hours of around 90% can be achieved in a polarizing electrode for an electric double layer capacitor made by using the activated carbon that has a median particle size within a range from 4 μm to 8 μm in the particle size distribution and a benzene adsorption ratio within a range from 47.0% to 60% by weight of activated carbon.

Second Aspect of the Present Invention

The activated carbon that constitutes the polarizing electrode for electric double layer capacitor according to the second aspect of the present invention is made by activating a hard-to-graphitize material with water vapor.

The term hard-to-graphitize material is used for comprehensive reference to materials made of organic compounds which are difficult to graphitize. Difficult to graphitize means that it is difficult to form a graphite structure by firing at a temperature higher than 3000° C. Formation of graphite structure can be verified by observing a distinct peak of 2θ around 25° in the X-ray diffraction pattern, as described in the first aspect.

The activated carbon that constitutes the polarizing electrode for an electric double layer capacitor of the second aspects of the present invention is preferably made in a manufacturing process based on the method described below.

First, stock feed used for manufacturing the activated carbon of the present invention will be described. A hard-to-graphitize material which is difficult to graphitize is preferably used as the stock feed to manufacture the activated carbon of the present invention. A graphitizing catalyst may be added during graphitization. As organic compounds which are difficult to graphitize, aromatic compounds such as furfuryl alcohol, polycarbonate, cellulose and phenol resin, and aliphatic compounds such as epoxy resin, PVDF (polyvinylidene fluoride), polyvinyl alcohol, nylon and polypropylene may be used.

The activated carbon that constitutes the polarizing electrode for an electric double layer capacitor of the present invention can be manufactured in the following procedure by using the materials as described above. A process of using phenol resin as the hard-to-graphitize material which is fired at a temperature so that a graphite structure is formed and is then activated with water vapor will herein be described.

The heat treatment at a temperature so that a graphite structure is formed is carried out at a temperature usually within a range from 400 to 1000° C., preferably from 500 to 800° C., and more preferably from 500 to 700° C., in a non-oxidizing atmosphere, for example, in the presence of a nitrogen (N$_2$) gas flow. Duration of the treatment is usually not longer than 24 hours, is preferably from 1 to 10 hours, and is more preferably from 2 to 5 hours. Other conditions for the treatment may be determined in accordance to such factors as the material to be used and the kind of electrode to be made.

Activation by water vapor can be carried out by an ordinary method. In a preferred embodiment, activation by water vapor is carried out as follows. A scrubbing bottle containing pure water is held at a temperature within a range from the room temperature to 100° C., preferably at 80° C., and nitrogen gas is passed through the water so that activation is carried out by means of the nitrogen gas containing water vapor. Specifically, the temperature is raised to a level of 800 to 1000° C., preferably 900° C. in the presence of nitrogen gas flow and, after a predetermined temperature (for example, 800° C.) has been reached, activation is carried out by using a mixed gas of nitrogen and water vapor for a period of 5 minutes to 10 hours.

The activated carbon prepared as described above is crushed by using a crushing means such as a jet mill, ball mill or the like, and the crushed powder is classified so as to obtain activated carbon having a predetermined particle size distribution for the polarizing electrode for an electric double layer capacitor of the present invention.

In the case in which crushing is conducted for a longer time, the activated carbon is contaminated with material from the balls of the ball mill or the liner as a result of chipping. The contamination amount also increases in the case in which the rotational speed increases.

The activated carbon thus obtained is then subjected to a conventional after-treatment such as washing, neutralization with acid or the like to obtain an activated carbon having a content of calcined ash of not more than 0.2% by weight.

It was confirmed by the measuring method specified in Japanese Industrial Standard JIS K1474-1991, that the amount of benzene adsorbed by the activated carbon thus obtained was not less than 54% and not more than 60% by weight of benzene.

The amount of benzene adsorption is an index that represents the degree of activation, which is determined by measuring the weight difference of benzene vapor adsorbed onto the activated carbon.

After the entire amount of the resulting calcined ash was dissolved in a phosphoric acid solution, quantitative analysis of the component of calcined ash was conducted using an ICP-AES (inductive plasma emission spectral analyzer, manufactured by Seiko Instruments Inc. under the trade name of SPS-4000). As a result, it was confirmed that the resulting calcined ash contain a trace amount of metal components such as copper, nickel, zinc, tin, iron and the like.

The activated carbon can then be used to make the polarizing electrode for an electric double layer capacitor by an ordinary method. In order to make a sheet-like polarizing electrode, for example, the following method may be used.

The activated carbon made from phenol resin, graphite powder used as an electrically conductive filler and Teflon® used as a binder are mixed in predetermined proportions (for example, 90:5:5 in weight proportion) and the mixture rolled into a sheet 150 μm in thickness. The sheet is punched through in circular shape to make a polarizing electrode having a diameter of 20 mm.

Then, as shown in FIG. 6, an electrode unit made by sandwiching a separator by two sheet-like polarizing electrodes 2 and 3 is disposed in a casing 6 made of an electrically conductive material that serves as the cathode. After pouring an electrolytic solution into the casing, a cap 5 made of an electrically conductive material that serves as the anode is placed on it and edges of the casing 6 and the cap 5 are caulked together via a packing 9 made of an insulating material for sealing, thereby to make the electric double layer capacitor 1.

The content of calcined ash (residual amount after ashing) which is an index that represents the activated carbon can be determined by weighing 40 g of the activated carbon thus obtained, calcining in atmospheric air at 700° C. for 36 hours and measuring the weight of the remaining calcined ash).

The cell resistivity which is an index that represents the performance of the capacitor was determined in the following manner. A PC solution of $1.8M(C_2H_5)_3CH_3N.BF_4$ was used as the electrolytic solution, and resistance upon discharge was determined after charging for two hours with constant current and constant voltage conducted at charge voltage of 2.5 V and charge current of 5 mA. Then, the cell resistivity was calculated by multiplying the resulting resistance by an electrode area.

The ratio of capacity maintained can be determined in the following manner. After charging for 12 hours with constant current and constant voltage conducted at charge voltage of 2.5 V and charge current of 5 mA, a test for standing in the environment at 25° C. for 72 hours was conducted. The ratio of the voltage immediately after removing the terminal to the voltage after standing for 72 hours was given in percentage.

EXAMPLES

The present invention will be described below by way of examples, but it should be noted that the present invention is not limited by the following examples.

Example 13

The activated carbon powder of this example was made by the following procedure.

(1) A phenol resin granulated to have a particle size of about 3 mm was carbonized by being held in a nitrogen gas flow at 900° C. for two hours.

(2) Carbon thus obtained was heated again in the nitrogen gas flow and, when the temperature reached 800° C., the nitrogen gas containing 5% water vapor and 5% carbon dioxide was supplied and the carbon was held at 900° C. (hereinafter referred to as an activation temperature) for two hours (hereinafter referred to as an activation time), so as to be activated.

(3) The activated carbon thus obtained was left to cool down, and was crushed by using a ball mill employing high-purity alumina balls and operated at a rotational speed of 25 rpm for 80 hours (hereinafter referred to as a crushing time), thereby to obtain the activated carbon of this example.

The residual amount after ashing was determined by weighing 40 g of the activated carbon thus obtained, calcining in atmospheric air at 700° C. for 36 hours and measuring the weight of the remaining calcined ash.

The activated carbon was mixed with 5% by weight of Teflon 7J® (manufactured by Du Pont-Mitsui Fluorochemicals Co., LTD.) and 5% of Denka Black® (manufactured by DENKI KAGAKU KOGYO KABUSHIKI KAISHA) added thereto as binder, and was formed by pressure powder molding into a polarizing electrode measuring 20 mm in diameter and 150 μm in thickness measured with a micrometer.

The cell resistivity of the capacitor was determined in the following manner. A PC solution of $1.8M(C_2H_5)_3CH_3N.BF_4$ was used as the electrolytic solution, and resistance upon discharge was determined after charging for two hours with constant current and constant voltage conducted at a charge voltage of 2.5 V and a charge current of 5 mA. Then, the cell resistivity was calculated by multiplying the resulting resistance by an electrode area.

The ratio of capacity maintained was determined in the following manner. After charging for 12 hours with constant current and constant voltage conducted at a charge voltage of 2.5 V and a charge current of 5 mA, a test of exposure to the environment at 25° C. for 72 hours was conducted. The ratio of the voltage immediately after removing the terminal to the voltage after standing for 72 hours is given in percentage.

Table 3 shows the content of calcined ash in the activated carbon obtained in Example 1, and the cell resistivity and the ratio of voltage maintained of the capacitor.

Examples 14 to 18

In these examples, activated carbons were made in the same manner as in Example 13, except for setting the crushing time to 85 hours (Example 14), 100 hours (Example 15), 110 (Example 16), 120 hours (Example 17) and 150 hours (Example 18). The content of calcined ash in the activated carbon, and the cell resistivity and the ratio of voltage maintained of the capacitor were also determined by similar methods. These figures are also shown in Table 3.

TABLE 3

| Example No. | Residual amount after ashing (ppm) | Cell resistivity ($\Omega \cdot cm^2$) | Ratio of voltage maintained (%) |
|---|---|---|---|
| 13 | 1980 | 3.40 | 93.2 |
| 14 | 1280 | 3.28 | 93.5 |
| 15 | 1540 | 3.36 | 93.6 |
| 16 | 1420 | 3.35 | 93.5 |
| 17 | 980 | 3.28 | 93.9 |
| 18 | 880 | 3.29 | 93.1 |

After the entire amount of calcined ash contained in each of the activated carbons obtained in Examples 13 to 18 was dissolved in a phosphoric acid solution, quantitative analysis of the component of calcined ash was conducted using ICP-AES (inductive plasma emission spectral analysis, manufactured by Seiko Instruments Inc. under the trade name SPS-4000). As a result, it was confirmed that the resulting calcined ash contained trace amounts of metal components such as copper, nickel, zinc, tin, iron and the like.

It was confirmed, by using the measuring method specified in Japanese Industrial Standard JIS K1474-1991, that the amounts of benzene adsorbed by the activated carbons obtained in Examples 13 to 18 were not less than 54% and not more than 60% by weight of benzene.

Comparative Example 11

In this comparative example, activated carbon was made in the same manner as in Example 13, except for setting the rotational speed of the crusher to 25 rpm and crushing time to 220 hours. The content of calcined ash in the activated carbon, and the cell resistivity and the ratio of voltage maintained of the capacitor were also determined by similar methods. These figures are shown in Table 4.

Comparative Examples 12 to 13

In these examples, activated carbons were made in the same manner as in Comparative Example 11, except for setting the crushing time to 270 hours (Comparative Example 12) and 300 hours (Comparative Example 13). The content of calcined ash in the activated carbon, and the cell resistivity and the ratio of voltage maintained of the capacitor were also determined by similar methods. These figures are also shown in Table 4.

TABLE 4

| Comparative Example No. | Residual amount after ashing (ppm) | Cell resistivity ($\Omega \cdot cm^2$) | Ratio of voltage maintained (%) |
|---|---|---|---|
| 11 | 2200 | 3.49 | 75.8 |
| 12 | 2640 | 3.56 | 59.3 |
| 13 | 3030 | 3.58 | 30.1 |

After the entire amount of calcined ash contained in each of the activated carbons obtained in Comparative Examples 11 to 13 were dissolved in a phosphoric acid solution, quantitative analysis of the component of calcined ash was conducted using ICP-AES (inductive plasma emission spectral analysis, manufactured by Seiko Instruments Inc. under the trade name SPS-4000). As a result, it was confirmed that the resulting calcined ash contained trace amounts of metal components such as copper, nickel, zinc, tin, iron and the like.

It was confirmed, by using the measuring method specified in Japanese Industrial Standard JIS K1474-1991, that the amounts of benzene adsorbed by the activated carbons obtained in Comparative Examples 11 to 13 were not less than 54% and not more than 60% by weight of benzene.

Figure 4:
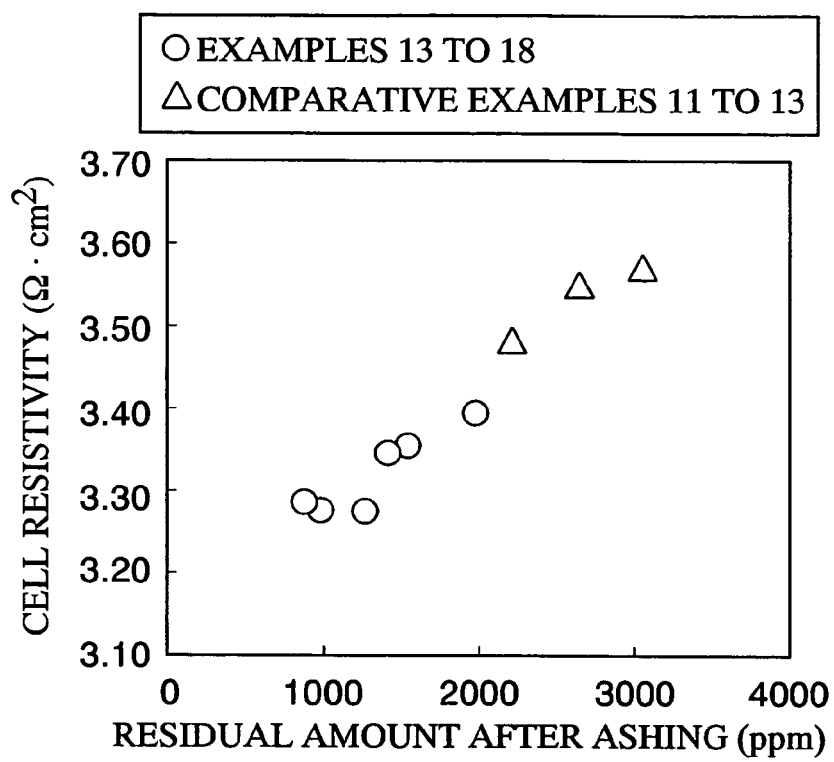
FIG. 4 is a graph showing the relationship between the residual amount after ashing in the activated carbon and the cell resistivity of the capacitor.

FIG. 4 is a graph showing the relationship between the content of calcined ash (residual amount after ashing) in the activated carbon and the cell resistivity of the capacitor.

From FIG. 4, it was found that the cell resistivity of the capacitor shows a tendency to decrease (3.40 $\Omega \cdot cm^2$ or less) as the residual amount after ashing decreases by using an activated carbon that has a residual amount after ashing of 2000 ppm (0.2% by weight).

Figure 5:
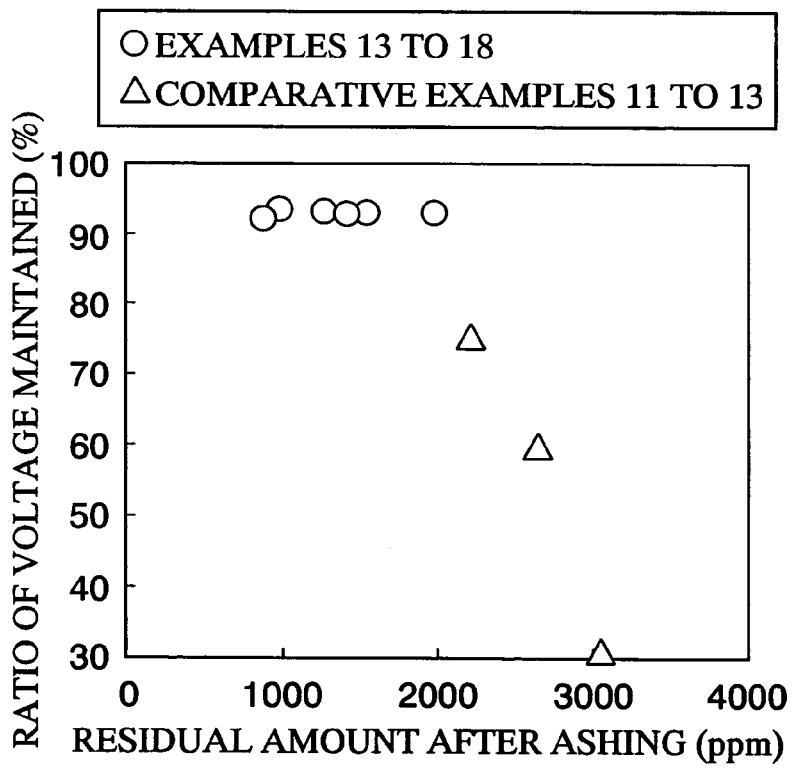
FIG. 5 is a graph showing the relationship between the residual amount after ashing in the activated carbon and the ratio of voltage held in the capacitor.

FIG. 5 is a graph showing the relation between the content of calcined ash (residual amount after ashing) in the activated carbon and the ratio of voltage maintained of the capacitor.

From FIG. 5, it was found that very high ratio of voltage maintained around 90% or greater can be ensured stably by using an activated carbon that has a residual amount after ashing of 2000 ppm (0.2% by weight).

It can be seen from the graph of FIG. 5 that very high ratio of voltage maintained of the electrode sheet greater than 90% can also be achieved by the activated carbon that has a residual amount after ashing of 2000 ppm which enables it to form an electrode sheet having a cell resistivity of 3.40 $\Omega \cdot cm^2$ or less as shown in FIG. 4.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description and is only limited by the scope of the appended claims.

What is claimed is:

1. A polarizing electrode for an electric double layer capacitor, comprising an activated carbon obtained by activating a hard-to-graphitize material with water vapor, wherein the activated carbon has a median particle size within a range from 4 μm to 8 μm in the particle size distribution as measured by a laser diffraction method and a benzene adsorption ratio is within a range from 47.0% to 60% by weight of activated carbon.

2. An electric double layer capacitor comprising an electrode unit comprising a current collector and polarizing electrode, a separator and an electrolytic solution, wherein the polarizing electrode is made of an activated carbon obtained by activating a hard-to-graphitize material with water vapor, while the activated carbon has a median particle size within a range from 4 μm to 8 μm in the particle size distribution as measured by a laser diffraction method and a benzene adsorption ratio is within a range from 47.0% to 60% by weight of activated carbon.

3. A polarizing electrode for electric double layer capacitor, comprising an activated carbon obtained by activating a hard-to-graphitize material with water vapor, wherein the activated carbon has a content of calcined ash of not more than 0.2% by weight.

4. An electric double layer capacitor comprising an electrode unit comprising a current collector and polarizing electrode, a separator and an electrolytic solution, wherein the polarizing electrode is made of an activated carbon obtained by activating a hard-to-graphitize material with water vapor and the activated carbon has a content of calcined ash of not more than 0.2% by weight.

* * * * *